US00RE42424E

(19) United States
(12) Reissued Patent
Flarup-Knudsen

(10) Patent Number: US RE42,424 E
(45) Date of Reissued Patent: Jun. 7, 2011

(54) METHOD AND APPARATUS FOR EXTRUSION OF EXPANDING WATER HOLDING PRODUCTS SUCH AS FOODSTUFF PARTICLES OR FEEDING STUFF PELLETS

(75) Inventor: Anders Flarup-Knudsen, Esbjerg (DK)

(73) Assignee: Andritz Feed & Biofuel A/S, Esbjerg (DK)

(21) Appl. No.: 11/076,587

(22) PCT Filed: May 27, 1999

(86) PCT No.: PCT/DK99/00284

§ 371 (c)(1),
(2), (4) Date: Jan. 16, 2001

(87) PCT Pub. No.: WO99/62361

PCT Pub. Date: Dec. 9, 1999

Related U.S. Patent Documents

Reissue of:
(64) Patent No.: 6,531,077
Issued: Mar. 11, 2003
Appl. No.: 09/701,302
Filed: Jan. 16, 2001

(30) Foreign Application Priority Data

May 29, 1998 (DK) ..... 1998 00737

(51) Int. Cl.
*B29C 44/34* (2006.01)
*B29C 45/17* (2006.01)
*B29C 44/02* (2006.01)
*B29B 9/06* (2006.01)

(52) U.S. Cl. ..... 264/53; 264/40.3; 264/142; 425/4 R; 425/149; 425/325; 425/376.1; 425/377; 425/382.3; 426/447; 426/448; 426/516; 426/518

(58) Field of Classification Search ..... 99/473, 99/483; 264/40.3, 53; 426/516
See application file for complete search history.

(56) References Cited

U.S. PATENT DOCUMENTS 1,924,827 A * 8/1933 Anderson ..... 99/354
(Continued)

OTHER PUBLICATIONS

Declaration of Dr. Judson M. Harper, Jul. 19, 2005.

(Continued)

*Primary Examiner* — Jeffrey Wollschlager
(74) *Attorney, Agent, or Firm* — Stites & Harbison PLLC; Douglas E. Jackson

(57) ABSTRACT

In the extrusion of feed-stuff pellets and relevant consumer products, the extruded products are subject to expansion as a result of the boiling of their water content when the products, after being exposed to high extrusion pressure and a correspondingly high temperature, are discharged to the atmosphere through the extrusion nozzles. Such an expansion is directly aimed at, but it is desirable to be able to control it, which is difficult by adjustment of the ordinary process parameters. With the invention it has been found that the expansion which arises can be controlled in a highly constant manner, i.e. by carrying out the extrusion into a closed chamber in which an over-pressure of a few bar is established in relation to the atmospheric pressure, and which can be regulated. The extrusion products can be continuously discharged from this chamber, or they can be discharged intermittently in portions. The over-pressure moderates the momentary development of steam in the extruded product, and the product is given time to stabilise before being discharged to atmospheric pressure, so that the subsequent further development of steam influences the structure of the product only to a minor degree.

7 Claims, 1 Drawing Sheet

U.S. PATENT DOCUMENTS

| | | | | | |
|---|---|---|---|---|---|
| 3,684,521 | A | * | 8/1972 | Glicksman | 426/656 |
| 3,778,522 | A | | 12/1973 | Strommer | |
| 3,832,431 | A | * | 8/1974 | Matthaei | 264/75 |
| 3,852,389 | A | * | 12/1974 | Adler et al. | 264/46.4 |
| 3,958,032 | A | * | 5/1976 | Merriam | 426/580 |
| 4,031,267 | A | * | 6/1977 | Berry et al. | 426/656 |
| 4,039,168 | A | * | 8/1977 | Caris et al. | 366/79 |
| 4,044,157 | A | * | 8/1977 | Wilding | 426/250 |
| 4,059,206 | A | * | 11/1977 | Ellwood | 222/413 |
| 4,095,001 | A | * | 6/1978 | Hildebolt et al. | 426/656 |
| 4,128,051 | A | | 12/1978 | Hildebolt | |
| 4,139,648 | A | * | 2/1979 | Small et al. | 426/511 |
| 4,175,486 | A | | 11/1979 | Hildebolt et al. | |
| 4,245,552 | A | | 1/1981 | Small et al. | |
| 4,323,528 | A | * | 4/1982 | Collins | 264/53 |
| 4,418,086 | A | * | 11/1983 | Marino et al. | 426/302 |
| 4,486,369 | A | * | 12/1984 | Schafler et al. | 264/51 |
| 4,744,993 | A | * | 5/1988 | Bisson et al. | 426/38 |
| 5,125,168 | A | * | 6/1992 | Aigeldinger | 34/92 |
| 5,149,555 | A | * | 9/1992 | Flindall | 426/448 |
| 5,413,746 | A | * | 5/1995 | Birjukov | 264/118 |
| 5,417,992 | A | * | 5/1995 | Rizvi et al. | 426/283 |
| 5,487,862 | A | * | 1/1996 | Foresman | 264/142 |
| 5,527,553 | A | * | 6/1996 | Kazemzadeh | 426/302 |
| 5,750,173 | A | * | 5/1998 | Kazemzadeh | 426/516 |
| 5,783,240 | A | | 7/1998 | Wenger et al. | |
| 6,093,350 | A | * | 7/2000 | Sadinski | 264/40.7 |
| 6,251,318 | B1 | * | 6/2001 | Arentsen et al. | 264/45.5 |

OTHER PUBLICATIONS

Joint Declaration of Drs. James R. Sholar and Margaret J. Hinds, Jul. 22, 2005.

USDA National Nutrient Database for Standard Reference, Release 17, Entry for "Peanuts, raw", 2004.

USDA National Nutrient Database for Standard Reference, Release 17, Entry for "Peanut flour, defatted", 2005.

USDA National Nutrient Database for Standard Reference, Release 17, Entry for "Peanut flour, low fat", 2005.

Rudrapatnam N. Tharanathan et al., Carbohydrate Composition of Groundnuts (*Arachis hypogea*), J. Sci. Fd Agric. 1975, vol. 26, pp. 749-754.

Report of Dr. Judson M. Harper, May 15, 2003.

J R Mitchell, Jintian Fan & J M V Blanshard, The Shrinkage Domain, Extrusion Communique, Mar. 1994, pp. 10-12.

American Heritage Dictionary of English Language: Fourth Edition entry for "starchy", 2005.

C.K. Wadhawan and W. Bushuk, Studies on Vitality of Commercial Gluten. II. Solubility Fractionation, Electrophoresis, and Fluorescence Results, Cereal Chem., vol. 66(6), pp. 461-466, 1989.

David A. Bender, Benders' Dictionary of Nutrition and Food Technology, Seventh Edition, Woodhead Publishing Limited, pp. 302 and 362, 1999.

Cy Lii, Investigation of the Carbohydrates of Glandless Cottonseed Flour, Cornell University, 1973, 34(2); 710, Abstract.

* cited by examiner

METHOD AND APPARATUS FOR EXTRUSION OF EXPANDING WATER HOLDING PRODUCTS SUCH AS FOODSTUFF PARTICLES OR FEEDING STUFF PELLETS

Matter enclosed in heavy brackets [ ] appears in the original patent but forms no part of this reissue specification; matter printed in italics indicates the additions made by reissue.

This invention relates to a method of product extrusion where the extruded product material is formed into discrete products which stabilize after extrusion of the product material.

This applies in the production of "solid" unexpanded products where it is desired to avoid expansion, and especially in the production of expanded products where the dimensions of the product are greater than the nozzle aperture(s), where it is aimed to achieve a specific dimension increase in relation to the nozzle dimension.

The problem presents itself mostly in the manufacture of expanded products where the expansion is normally aimed at in order to ensure specific characteristics, such as viscosity (fish-foods), sinking characteristics (specifically slow sinking speed of fish-foods), liquid absorption characteristics (fish-foods, pet-food, foodstuffs), constant low specific density (pet-food, snacks, breakfast products), constant crispness (fish-foods, pet-food; foodstuffs), constant physical shape (all products).

The ensuring of the above-mentioned constancy/controllability of the expansion gives rise to great problems with all extrusion systems. The degree of expansion of the extruded product in the extrusion plant depends on conditions such as:

- Composition of raw materials.
- Characteristic/quality of raw materials.
- Extrusion process parameters:
  - Dosing of the individual ingredients:
    - Flour mixing.
    - Liquids.
    - Steam.
  - Cooling/heating of worms/linings.
  - Speed of rotation of worm conveyor.
- Configuration of the extruder's worm conveyor.
- Configuration of the extruder nozzle.
- Wear state of the process parts.

Especially the variations in the raw material and the wear state of the extruder's worm conveyor and linings give rise to variations in production which are difficult to predict.

Depending on the conditions which give rise to the product variations, it can be particularly difficult to ensure (via automatic process control and regulation, or manually), that the finished products correspond to the product specifications with reasonable tolerances.

During the extrusion process, products such as those described above containing starchy raw materials will, as a consequence of a process temperature of 100-200° C., a moistness of 10-35% $H_2O$, and a pressure of 2-80 bar in the extruder worm, typically gelatinize and convert to a plastic/elastic liquid-like form.

In its passage through the extruder's nozzle arrangement, the product will move from process pressure (2-80 bar) to atmospheric pressure, at which the cutting-off of the product in the desired length normally takes place. The fall in pressure across the nozzle plate and the energy content of the product will result in a momentary evaporation of a part of the product's water content in the opening of the extruder nozzles. The evaporation of the water forms steam pockets in the plastic/elastic mass, whereby the product expands. The fall in temperature brought about by the momentary evaporation results in a hardening of the product into a permanently firm and physical shape.

The expansion of the product normally stops,

- when the steam pressure in the steam pockets achieves a balance in relation to the elasticity of the mass,
- and/or further development of steam stops as a consequence of the consumption of energy involved in the evaporation resulting in a drop in temperature to a temperature corresponding to the boiling point of the mass,
- and/or when all of the walls in the steam pockets burst as a consequence of the internal steam pressure, and the pressure in the pockets is hereby normalised, whereby the driving force for further expansion disappears.

THE INVENTION

It is characteristic for all known extrusion systems for the production of feeding stuffs, foodstuffs or the like that the nozzle and cutting-off system of the extruding process operate under constant pressure—normally atmospheric pressure or possibly slight under-pressure—created by associated aspiration systems or pneumatic transport systems.

To overcome or minimize the expansion control problems specified above, it has been found by the present invention that the extrusion with advantage can be effected into a pressure chamber at the outlet side of the nozzle plate, in which the product is shaped, cut-off and stabilised to a permanent form (expansion degree) before being discharged to atmospheric pressure. By regulation of the working pressure of the pressure chamber, it is possible to regulate the boiling point for the mass in the mouth of the nozzle arrangement, whereby the development of steam brought about by the extrusion can be controlled. This provides a corresponding possibility of controlling the driving force which brings about the expansion of the product.

In accordance with the invention, the new method will be able to be used for optimisation of the expansion degree and capillary structure in products from all known types of extruders (single-worm, double-worm, dry extruders, cooking extruders with/without preconditioning).

The invention will make it possible to use raw materials in the extrusion process which have hitherto been avoided because of control problems related with the raw materials.

This situation results in smaller needs for (dependence on) scanty resources/expensive ingredients, and the possibility to a greater extent of composing receipts (raw material compositions) on the basis of nutritional/cost evaluation, with less regard being paid to the performance of the receipt/raw materials from the point of view of extrusion.

In accordance with the invention, the method will make it possible to increase the capacity of extruders which are mounted with such equipment, since the practical exploitable capacity of many plants is today restricted by the limit of controllability of the product's physical shape.

BRIEF DESCRIPTION OF THE FIGURE

The invention, which concerns both a method and a complete plant and an aggregate for building into existing extruders, is illustrated in the drawing, which is a schematic view of an example embodiment of the invention.

DETAILED DESCRIPTION OF THE INVENTION

Figure 1:
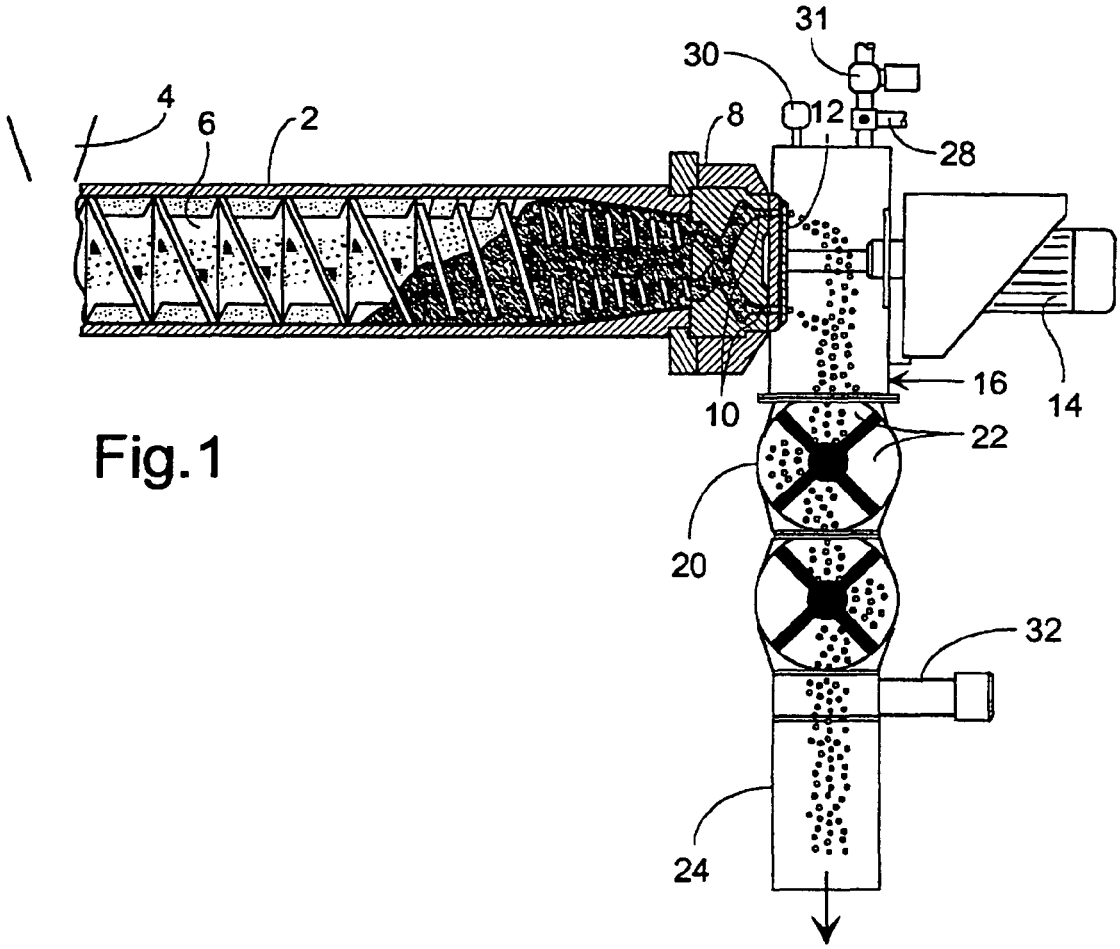

To the left is shown an extruder 2 with a supply funnel or conduit for the material which is to be formed into the desired granular product, and with an extruder worm 6 for transporting the material forward towards a nozzle unit 8 with nozzle channels 10 through which the material is pressed out in string form. In quite the same way as a meat mincer, in front of the nozzle unit 8 there is provided a rotating knife 12 which is driven by a motor 14, the result being that said strings are continuously cut over in the formation of pellets which can simply fall down into a suitable collection or transport arrangement.

In accordance with the invention, opposite the delivery end of the nozzle unit 8 there is a box element 16 which is connected with the edge of the nozzle unit in a tight-fitting manner, and which also has a tight-fitting sleeve 18 for the drive shaft of the motor 14. The box element 16 has a bottom part in the form of a rotating sluice wheel 20 with sluice pockets 22, in that also here there is hereby a tight-closing sealing of the box element, which from here extends downwards as a discharge chute 24 for the material, which by rotation of the sluice pockets 22 is made to leave the box part 16.

The box part 16 constitutes a pressure chamber in which, as a consequence of the emission of steam from the material which leaves the nozzle unit 8, there is already built up a certain over-pressure, which can be controlled by venting through a pressure regulation valve 28 and possibly monitored via a pressure transducer 30. Separate pressure supply can take place via a valve 31 for compressed air or steam, e.g. in a starting phase. Possible condensate will be absorbed by the pellet product, from which it is removed by normal subsequent drying of the product. The escape steam from valve 28 can be utilized for various heating purposes.

The increased pressure shall serve only or predominantly the purpose of raising the boiling point of the product's water content during the phase in which it leaves the nozzle unit 8, and with precisely this object in mind it will normally be realistic and adequate to operate within a pressure interval of approx. ½-6 bar.

Down under the sluice wheel—or in principle even above it—there can be disposed a sample-taker 32 which enables a continuous control of the product to be effected, including with regard to its specific weight as a function of its degree of expansion. It has naturally also been possible with the known technique to be able to effect a corresponding supervision with related possibility for adjustment of certain process parameters in front of the nozzle unit 8, but with the invention it is possible to work with a further and extremely important parameter, i.e. the pressure in the chamber 16. Precisely this parameter will be able to be controlled with a minimum of time difference between an ascertained regulation requirement and the execution of the related regulation.

It will be obvious that the invention will not be limited to the embodiment shown, in that e.g. use can be made of a relatively large pressure chamber 16 in which a batch of discharge material can be accumulated, which can then be removed without the use of any special form of discharge sluice, but possibly during brief stopping of the extruder 2, 6.

The method according to the invention can be based on work for a given process being carried out with associated, manual adjustment parameters, also including for the pressure in the chamber 16, but the work can naturally also be carried out with various degrees of automatic control determined by a given choice of product. It will be appreciated that in such a control system a detected change of pressure or temperature in the pressure chamber will amount to a very fast acting control parameter.

It should be mentioned that means can be provided inside the chamber 16 to prevent the descending pellets from packing together at the bottom, i.e. so that they are given better time to stabilise in the free state after their formation, e.g. by sliding down in thin layers along a system of inclined plates.

It has been found that normally it will be fully sufficient if the pressure chamber is designed to operate at a maximum pressure of 6 bar, i.e. it will seldom be advisable to construct it to resist still higher pressures. It will be understood, however, that the invention, in principle, is not directly limited to any particular maximum pressure.

Until a high experience has been reached it will be advisable to arrange for test runs in order to determine a desirable operational pressure in the pressure chamber for each new product, just as it is usual to determine the other relevant parameters in this manner for aiming at specific properties of the products.

As an example, it was desired to determine the sinking capacity of fish feed pellets based on a certain 22% wheat formula extruded through 3.15 mm holes in the die plate. A low number of pellets under different counterpressures were produced and some 25 pellets of each group were measured, bulk weighed and tested for floating characteristics. The following results were noted:

| | | | |
|---|---|---|---|
| Pressure, bar | 0 | 0.3 | 1.75 |
| Pellet width average | 48 mm | 43 | 42 |
| Std. deviation | 2.5 | 1.4 | 0.9 |
| Pellet length average | 43 | 45 | 45 |
| Std. deviation | 1.6 | 1.8 | 3.3 |
| Bulk weight | 526 g/l | 626 | 665 |
| Float: | | | |
| 4% salt | 100% | 14% | 0% |
| 10% salt | 98% | 40% | 2.5% |

What is claimed is:

[1. Extrusion plant for the manufacture of a product material into free products which free products at atmospheric pressure heat expand by internal boiling of water by pressure relief after extrusion of the product material, the plant comprising:

a nozzle unit including extrusion nozzles, means for pressing the product material out through the nozzles to form an extruded product material which in turn immediately forms a plurality of free products, a sealed off chamber located on the discharge side of the nozzle unit for temporary receipt of the plurality of free products direct from the nozzle unit such that the plurality of free products heat expand as desired and stabilize in the sealed chamber, and a pressure regulation means connected with said sealed off chamber for maintaining a desired, adjustable pressure as the plurality of free products heat expand as desired and stabilize in said chamber.]

[2. Plant according to claim 1, wherein the pressure regulation means comprises a controlled escape valve for the moderation of a build-up of pressure which is already brought about by an emission of steam from the extruded product material.]

[3. Plant according to claim 2, wherein the pressure regulation means further comprises a pressure-controlling valve for a supply of compressed air to the pressure chamber.]

[4. Plant according to claim 1, wherein the pressure regulation means are arranged to maintain an overpressure of ½-6 bar in the pressure chamber.]

[5. Plant according to claim 1, wherein the sealed off chamber is arranged for continuous operation, and further including a sluicing-out arrangement for continuous discharge of the stabilized free products.]

[6. Plant according to claim 1, wherein the sealed off chamber is arranged for intermittent operation with successive discharge of a large, accumulated portion of extruded free products by a simple opening out to the atmosphere.]

[7. Unit for building-in to an extrusion plant, which extrusion plant is for the manufacture of a product material into a plurality of free products which free products at atmospheric pressure heat expand by internal boiling of water by pressure relief after extrusion of the product material, and which extrusion plant includes (a) a nozzle unit including extrusion nozzles and (b) means for pressing the product material out through the nozzles to form an extruded product material which in turn immediately forms a plurality of free products, said unit comprising:

a chamber part for mounting in a closely-fitting manner on a discharge side of the nozzle unit, said chamber part comprising a sealed chamber which receives the free products, an escape valve for steam from said sealed chamber, and means for outletting free products therefrom after the free products heat expand as desired and stabilize in the sealed chamber.]

8. A method of producing free products from a product material [which expands and stabilizes after extrusion by a heat expansion caused by an internal boiling of water by pressure relief after an extrusion of the product material through extrusion nozzles] *where the produced free products have a controlled specific weight*, comprising the steps of:

*selecting a product material which would normally expand and stabilize after extrusion by a heat expansion caused by an internal boiling of water by pressure relief after an extrusion of the product material through extrusion nozzles,*

*gelatinizing the product material in an extruder to a plastic/elastic liquid-like form;* effecting an extrusion of the product material *from extrusion nozzles of the extruder and cutting the product with a rotating knife at the outlet of the extrusion nozzles* to form the extruded product material into a plurality of free products in a sealed off chamber, [and] *said effecting step including the steps of*

*maintaining a fall in pressure across the extrusion nozzles from the extruder into the sealed off chamber,*

*momentarily evaporating a part of the gelatinized product material's water content as the gelatinized product material is in respective mouths of the extrusion nozzles, which evaporating results in a fall in temperature of the gelatinized product material in the sealed off chamber,*

*forming steam pockets in the gelatinized product material as a result of the evaporating of the part of the gelatinized product material's water content,*

*expanding the gelatinized product material in the sealed off chamber as a result of the formation of the steam pockets, and*

*hardening the gelatinized product material as a result of the fall in temperature of the part of the gelatinized product material's water content,* maintaining [in] *throughout* the sealed off chamber a controlled [pressure] *and uniform gaseous overpressure of at least 0.3 bar* for effectively controlling the [temperature of] *amount of water content being evaporated by* said internal boiling of the free products *in the mouths of the extrusion nozzles, and hence for precisely controlling the expansion and thus the resulting specific weight of the extruded product, and*

*discharging the finished free products from the controlled overpressure of the sealed off chamber.*

9. A method according to claim 8, whereby the extrusion step is effected continuously, and further including the step of discharging the free products continuously after a temporary stay in the sealed off chamber by means of a sluicing-out arrangement.

10. A method according to claim 8, wherein the maintaining step [which] maintains the controlled [pressure is an] overpressure [of] *at* ½-6 bar.

11. A method according to claim 10, further including the step of controlling the overpressure in the pressure chamber primarily by a controlled outlet of steam originating from the extruded product material.

12. A method according to claim 8, whereby the extrusion is effected discontinuously, and further including the step of discharging the free products batchwise from the sealed off chamber.

*13. A method according to claim 8, wherein the overpressure is controlled by controlled inlet of compressed air into the sealed off chamber.*

*14. A method according to claim 8, further including the steps of:*

*taking out samples of the extruded product material;*

*measuring of parameters of the samples; and*

*continuously controlling the pressure in the sealed off chamber based on the measurements.*

* * * * *